United States Patent Office 3,376,190
Patented Apr. 2, 1968

3,376,190
AGENT FOR THE COMBATMENT OF MOULDS
Harmannus Koopman and Albert Tempel, Van Houtenlaan, Weesp, Netherlands, assignors to North American Philips Company, Inc., New York, N.Y., a corporation of Delaware
No Drawing. Filed Jan. 15, 1965, Ser. No. 425,926
Claims priority, application Netherlands, Jan. 17, 1964, 64—307
6 Claims. (Cl. 167—33)

ABSTRACT OF THE DISCLOSURE

Use of tetrabromo compounds of the formula

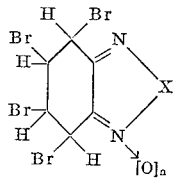

as fungicides. In the formula $n$ is 0 or 1 and X is oxygen or sulfur.

---

Compounds of Formula I

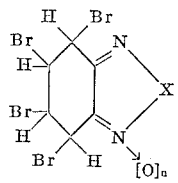

in which formula X is an oxygen atom or a sulphur atom and $n=0$ or 1, are described in the literature in itself (Chemical Abstracts 52, 3791$^g$, J. Chem. Soc. 1931, page 3310), without stating any biological activity.

It has been found now that these compounds have a particularly interesting fungicidal activity as a result of which they are suitable for use as active constituents in agents for the combatment of moulds.

The invention relates to agents for the combatment of moulds which contain a compound of the above described Formula I as the active substance and to a method of combating moulds in which these agents are used.

It has also been found that these compounds are very sparingly toxic for warm-blooded animals, as a result of which the new agents according to the invention may widely be used.

The invention relates in particular to fungicidal agents which are suitable for use in agriculture. It has been found that the above compounds, in concentrations in which they can give already a total inhibition of the development of various moulds causing plant diseases, do not adversely influence the growth of higher plants. As a result of this, the new fungicidal agents are not only to be considered for disinfecting i.a. spaces, harvested vegetation and, for example, seeds, but the present invention relates more in particular to agents for the combatment of moulds on plants and for protecting plants against the attack by moulds.

For example, when spraying a number of types of plants, for example, dwarf bean, tomato, oats and beet with a 1% solution in a dosage corresponding to 10 kg./ha. of tetrabromtetrahydrobenzthiadiazol (the compound of Formula I, in which X=S and $n=0$) no damage at all was found, while on spraying with tetrabromtetrahydrobenzfurazan and tetrabromtetrahydrobenzfuroxan (compounds of Formula I, in which X=0 and $n=0$ and 1 respectively) in this very high concentration only a few insignificant spots were visible on the leaf.

The fungicidal activity of the compounds was tested inter alia in in-vitro experiments using the mould species *Fusarium culmorum*, *Venturia inaequalis* and *Sclerotinia fructigena* as test objects, in which the three above substances, in dilutions of less than 0.01%, still showed a total inhibition of the development of the fungi. As is known, the substances of Formula I may occur in various stereo-isomeric forms which, it is true, may show certain specificities in biological activity, but it was found that various stereo-isomeric substances of the same structural Formula I still show some correspondence in having a fungicidal activity.

For example, of tetrabromtetrahydrobenzfuroxane both an isomer with a melting point of 170–172° and an isomer with a melting point 114–116° C. were tested and both substances showed a strong activity against the above mould species.

In experiments which were carried out on leaves of living plants it was found that in particular compounds of Formula I, in which X is an oxygen atom, have a very strong activity against *Phytophthora infestants*, the provocative agent of potato blight. The activity of these compounds in this respect even exceeded that of the known fungicidal agent on the basis of triphenyltinhydroxide which is commercially available under the trade name DU-TER.

In field experiments, in which the activity of tetrabromtetrahydrobenzfuroxane against Phytophthora in potatoes was compared with that of the known fungicidal agent on the basis of manganese-ethylene-1,2-bisdithiocarbaminate, which is commercially available under the trade name maneb, the two above mentioned stereo-isomeric compounds were found to excel the known maneb significantly.

It was found that the active substances have a good stability, as a result of which the agents according to the invention are also suitable for the preventive protection of plants against mould infections. For example, in experiments with young apple plants, agents according to the invention were found to give a better protection against *Venturia inaequalis*, the provocative agent of apple scab, than the agent on the basis of N-(trichloromethylthio)-4-cyclohexene-1,2-dicarboximide which is commercially available under the trade name Captan and which is frequently used against this disease.

The agents according to the invention comprise the known forms in which fungicidal substances are brought before use, in which the active substance is mixed with or dissolved in a solid or liquid carrier material to which a surface-active substance or a dispersion agent or adhesive may be added, for example, dusts, fumigating candies, aerosols, dispersions and emulsions. In the case of dispersions and emulsions, water is preferably used as a diluent in which, as so-called primary compositions, readily water-dispersible powders, wettable powders and water-emulsifiable oils or pastes are prepared as fungicidal agents and which are diluted with water only shortly before or during spraying.

The concentration of the active substance in the agents according to the invention may consequently vary within very wide limits, for example, from 95% by weight in a wettable powder which would contain, in addition to the active substance, only a dispersion agent, to, for example, 0.001% by weight in an aqueous liquid to be sprayed.

Dusts according to the invention are obtained by intimately mixing, for example, grinding together, the active substance of the Formula I with an inert solid carrier material, for example, in a concentration of from 1 to 50% by weight. As examples of suitable solid carrier materials may be mentioned talcum, kaolin, pipeclay, diatomaceous earth, dolomite, gypsum, chalk, bentonite or attapulgite and mixtures of these and similar substances. Alternatively, organic carrier materials, for example ground shells of walnuts, may be used.

Wettable powders according to the invention contain the active substance of Formula I, at least one dispersion agent, for which, for example, the agents known for this purpose, such as lignine sulfonates, alkylnaphthalene sulfonates, are to be considered, in addition preferably also a wetting agent, for which, for example, fatty alcohol sulfates, alkylarylsulfonates or fatty acid condensation products, for example, those known under the trade name "Igepon" are to be considered, while in addition preferably an inert solid carried material is added to such a mixture. For example, a wettable powder is obtained by mixing the active substance with 1 to 5 parts by weight of a dispersion agent, 1-5 parts by weight of a wetting agent and 10-80 parts by weight of one of the above solid inert carrier materials. For the preparation of miscible oils the active compound is dissolved or finely divided in a suitable solvent which preferably is poorly miscible with water and to this solution is added an emulsifier. Suitable solvents are, for example, xylene, toluene, petroleum distillates, which are rich in aromates, for example, solvent naphtha, distilled tar oil and mixtures of these liquids. As emulsifiers may be used, for example, alkylphenoxylpolyglycol ethers, polyoxyethylene sorbitan esters of fatty acids of polyoxyethylene sorbitol esters of fatty acids. The concentration of the active compound in these miscible oils is not restricted to narrow limits and may vary, for example, between 2 and 50% by weight. In addition to these wettable powders and miscible oils may be mentioned as high concentrated primary composition a solution of the active substance in a readily water-miscible liquid, for example, acetone, to which solution a dispersion agent and if desired, a wetting agent is added. When diluted with water shortly before or during spraying, an aqueous dispersion of the active substance is formed.

The atomisation and the spraying of the agents according to the invention is carried out in normal manner in a concentration which is adapted to circumstances in use, a concentration which is not restricted to narrow limits and may lie, for example, between 0.01 and 5 and as a rule between 0.01 and 0.5% by weight.

An aerosol preparation according to the invention is obtained in normal manner by incorporating the active substance, if desired in a solvent, in a volatile liquid to be used as a propellant, for example, the mixture of chloro-fluoro derivatives of methane and ethane, commercially available under the trade name Freon.

Fumigating candles or fumigating powders, i.e. preparations which develop a fungicidal smoke during burning, are obtained by incorporating the active substance of Formula I in a combustible mixture which contains, for example, a sugar or a wood as a fuel preferably in a ground form, a substance to maintain the combustion, for example, ammonium nitrate or potassium chlorate, and further a substance to delay the combustion, for example, kaolin, bentonite and/or colloidal silicic acid.

In addition to the above ingredients, the agents according to the invention may also contain other substances known for use in this type of agent.

For example, a lubricant, such as calcium stearate or magnesium stearate, may be added to a dust. Alternatively, for example, "adhesives," such as polyvinyl alcohol cellulose derivatives, or other colloidal materials, such as casein, may be added in order to improve the adherence of the fungicidal agents to the surface to be protected.

If desired, also other pesticidal compositions, for example, insecticides, acaricides or also other fungicides may be incorporated in the agents according to the invention, when a wider pesticidal activity is aimed at.

In the following examples some compositions of agents according to the invention are given for illustration without this involving any restriction to these specific formulations. In the examples are used the codes indicated after the substances of Formula I to be mentioned below.

| | |
|---|---|
| A | X=S and $n$=0, tetrabromtetrahydrobenzthiadiazole of melting point 152–154° C. |
| B | X=0 and $n$=0, tetrabromtetrahydrobenzfurazane of melting point 143–145° C. |
| C | X=0 and $n$=1, tetrabromtetrahydrobenzfuroxane of melting point 170–172° C. |
| D | X=0 and $n$=1, tetrabromtetrahydrobenzfuroxane of melting point 114–116° C. |

EXAMPLE 1

| | Parts by weight |
|---|---|
| Substance B | 25 |
| Attaclay | 40 |
| Kaolin | 25 |
| Polyfon H (West Virginia Co.) | 7 |
| Sodium oleyl N-methyltaurate | 3 | were ground in a mill to form a wettable powder.

EXAMPLE 2

| | Parts by weight |
|---|---|
| Substance D | 50 |
| Sodium dodecylbenzene sulfonate | 3 |
| Sodium lignine sulfonate (brand Polyfon H) | 7 |
| Kaolin | 40 | were ground together to form a wettable powder.

EXAMPLE 3

A water-miscible oil is obtained by incorporating 25 parts by weight of substance A together with 5 parts by weight of a mixture (1:1) of alkylphenolpolyglycol ether and calcium dodecylbenzene sulfonate in 70 parts by weight of xylene.

EXAMPLE 4

A fumigating candle is composed containing:

| | G. |
|---|---|
| Substance D | 16 |
| Sandal wood | 15 |
| Wood dust | 12 |
| Colloidal silicic acid | 3 |
| Bentonite | 4 |
| Ammonium nitrate | 40 |

EXAMPLE 5

For an aerosol preparation of 10 g. of substance B is dissolved in 20 ml. of methylene chloride and incorporated in 80 g. of Freon.

EXAMPLE 6

A dust formulation is prepared by grinding 3 g. of substance C together with 10 g. of Attaclay and 87 g. of talcum.

In the examples to be described below the action of agents according to the invention and their use is illustrated without this involving any restriction of the invention.

Variations both in the composition of the agents and in their use are known in the field of the combatment of moulds and it is also known that it is impossible to state absolute limits for the quantities of fungicides which could be used in all circumstances.

In general it may be said that, when using 0.012 to 10 kg. of active substances per $m.^2$ a sufficient effect is reached. When spraying plants a quantity of from 0.2 to 8 kg. per ha. will in general be sufficient.

EXAMPLE 7

The activity in vitro of a number of substances was determined in the spore germination test on object-glasses. One drop of an aqueous suspension of the active substance and one drop of an aqueous suspension of spores of *Fusarium culmorum* (F) and of *Venturia inaequalis* (V) respectively, were brought on each object glass in four paraffin circles. A little culture medium (cherry-juice)

was added. The concentration of the spores was adjusted to 10,000 per ml. The concentration of the active substance differed for each object-glass. A series of glasses with each a series of four experiments each having a different concentration was kept in a conditioned space for 20 hours at 23–24° C. at high constant humidity.

Then it was tested at what concentration of the active substance a total inhibition of the spore germination occurred.

In the table below a few results are given in which the numbers indicated for the active substance after the codes indicate the negative logarithms of the minimum concentrations of the active substance at which total inhibition just occurs.

TABLE I

| Code | F | V |
|---|---|---|
| A | 4.7 | 5.6 |
| B | 6.2 | 6.2 |
| C | 5.9 | 5.9 |
| D | 5.0 | 5.0 |

EXAMPLE 8

The activity of the agents according to the invention was also established in vitro in a mycelium-growth experiment. In a horizontally mounted test tube which in the proximity of the aperture had a dent serving as a threshold, a layer of potato agar, to which the agent to be tested was added, was provided and on this an agar sponge was laid which was overgrown with the mould *Sclerotina fructigena*. After 5 days in a conditioned space at 23–24° C. the linear growth of the culture was measured.

For experiments which were carried out in triple the table below states in column $P_c$ the negative logarithm of the concentration of the active substance and the column "effect" states a number indicating the percentage of the growth compared with that of a mycelium culture to which no fungicide was added.

TABLE II

| Code | $P_c$ | Effect | | |
|---|---|---|---|---|
| A | 5 | 10 | 5 | 7 |
|   | 4 | 4 | 3 | 2 |
| C | 5 | 0 | 5 | 1 |
|   | 4 | 0 | 0 | 0 |
| D | 5 | 28 | 28 | 28 |
|   | 4 | 0 | 0 | 0 |
| B | 5 | 0 | 0 | 0 |
|   | 4 | 0 | 0 | 0 |
| Untreated | | 100 | 100 | 100 |

EXAMPLE 9

Three tomato leaves (Cultivar Bonny Best) were placed in each time 50 ml. bottles. These leaves were previously sprayed with a spray-liquid according to the invention in a manner such that always 5 ml. of aqueous suspension per 1000 cm.² were sprayed and the dosage of the administered agent was consequently varied by changing the the concentration of active substance in the spray-liquid; after the sprayed leaves had dried, they were sprayed with a suspension of zoospores (100,000 per ml.) of *Phytophthora infestans* obtained from sporangia cultivated on potato tubers. In each bottle three leaves were provided which were sprayed with a dispersion of the same concentration of active substance. The bottles containing the leaves were first placed in a dark room with a relative humidity of 95–100% and a temperature of 15° C. After 24 hours the space was illuminated with TLF 40 W/33-tubes (3000–6000 lux the height of the plants), the temperature increasing to 18° C. After 3 days, after a good mycelium had formed in the leaves of the blank, the attack of the various experimental groups was estimated per bottle. In percent of the attack of the blank the results are given in the table below with a few agents according to the invention in comparison also with those obtained with the known agent against potato blight, DU-TER.

In this application the concentrations of active substances were $10^{-3.5}$ and $10^{-4.5}$ in the spray liquids.

TABLE III

| $P_c$ | 3.5 | 4.5 |
|---|---|---|
| B | 1 | 11 |
| C | 2 | 22 |
| D | 6 | 25 |
| DU-TER | 29 | 42 |
| Untreated | 100 | 100 |

EXAMPLE 10

Young apple plants, seedlings of approximately 15 cm. high, having 6–8 leaves, were sprayed with various agents according to the invention in different concentrations. Per concentration 15 seedlings were sprayed. The spray liquids were obtained by dispersing the agents to the desired concentrations in water. Per plant 2 ml. of the aqueous suspension was sprayed. After the spray liquid had dried, each plant was sprayed with 3 ml. of a conidia suspension obtained from apple leaves attacked by *Venturia inaequalis* and, which suspension was adjusted to approximately 180,000 conidia per ml. of water. The plants were then placed in a dark room at 16° in a moist container and kept wet for 48 hours. Then the container was illuminated (3000–6000 lux the height of the plants) the temperature increasing to 19° C. After a fortnight the growth of the mycelium on the infected shoots was evaluated and expressed for agents according to the invention in percent of the attack of the blank indicated below for spray liquid concentrations $10^{-3}$ and $10^{-4}$ in Table IV. For comparison also the activity of the known agent against apple scab, Captan, is given in the table.

TABLE IV

| $P_c$ | 3 | 4 |
|---|---|---|
| B | 1 | 25 |
| C | 0 | 24 |
| D | 0 | 3 |
| Captan | 6 | 36 |

EXAMPLE 11

Potatoes of the race "Bintje" were planted on Aug. 1, 1964, in plots of 2 m.². The objects were scattered at random in fourfold over the area. Sprayings were carried out with 100 ml. of spray liquid per plot namely on August 23 and 30, September 6, 12, 19 and 27 and October 1. Of each fungicidal agent 1.44 and 3.75 kg./ha. per time per 4 plots was sprayed by dispersing in the spray liquids various amounts of a spray powder. On October 10 the attack of the foilage by *Phytophthora infestans* was evaluated in comparison with untreated plots. In the table below the result is given in percent while in addition for comparison the results with the known fungicide maneb are indicated.

TABLE V

| Untreated | Dosage in kg./ha. | Attack of the foliage in percent of the blanc 100 |
|---|---|---|
| D | 1.44 | 5.3 |
|   | 3.75 | 0.0 |
| C | 1.44 | 1.7 |
|   | 3.75 | 0.0 |
| Maneb | 1.44 | 15.8 |
|   | 3.75 | 12.3 |

What is claimed is:
1. A method of combating fungi which comprises contacting said fungi with a fungicidally effective amount of a heterocyclic compound of the formula:

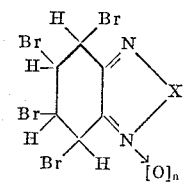

wherein X is a member selected from the group consisting of oxygen and sulfur and $n$ is an integer of 0 to 1.

2. The method of claim 1 wherein X is oxygen.

3. The method of claim 1 wherein X is oxygen and $n=0$.

4. A method of combating fungi which comprises contacting said fungi with a fungicidally effective amount of tetrabromotetrahydrobenzothiadiazole.

5. A method of combating fungi which comprises contacting said fungi with a fungicidally effective amount of tetrabromotetrahydrobenzofurazane.

6. A method of combating fungi which comprises contacting said fungi with a fungicidally effective amount of tetrabromotetrahydrobenzofuroxane.

References Cited

Chem. Abst., 51: 14697(b) (1957).
Chem. Abst., 52: 3791(g) (1958).

ALBERT T. MEYERS, *Primary Examiner.*

J. GOLDBERG, *Assistant Examiner.*